United States Patent [19]

Kerger et al.

[11] Patent Number: 4,760,990
[45] Date of Patent: Aug. 2, 1988

[54] DIAPHRAGM VALVE

[75] Inventors: Leon Kerger, Helmdange; Paul Kremer, Walferdange; Jean-Claude Schmitz, Bridel, all of Luxembourg

[73] Assignee: Ceodeux S.A., Luxembourg

[21] Appl. No.: 58,301

[22] Filed: Jun. 5, 1987

[51] Int. Cl.$^4$ .............................................. F16K 31/00
[52] U.S. Cl. ................... 251/335.2; 251/214
[58] Field of Search ............................. 251/335.2, 214

[56] References Cited

U.S. PATENT DOCUMENTS

| Re. 30,989 | 7/1982 | Bake et al. | 251/335.2 |
| 1,485,792 | 3/1924 | McKay | 251/335.2 |
| 2,630,290 | 3/1953 | Courtot | 251/335.2 |
| 2,654,559 | 10/1953 | Franck | 251/335.2 |
| 2,702,686 | 2/1955 | Fortune | 251/335.2 |
| 3,979,105 | 9/1976 | Pool et al. | 251/335.2 |
| 4,171,792 | 10/1979 | Bass | 251/335.2 |
| 4,606,374 | 8/1986 | Kolenc et al. | 251/335.2 |

FOREIGN PATENT DOCUMENTS 1177123 4/1959 France ...................... 251/335.2

Primary Examiner—A. Michael Chambers
Attorney, Agent, or Firm—Fishman, Dionne & Cantor

[57] ABSTRACT

The valve comprises a body containing a closing member with a sealing surface at the intersection of an inlet duct and an outlet duct for the passage of gas, a piston subjected to the action of a spring or the like and a control device being connected to the closing member via a pusher and via a sealing diaphragm arranged between the pusher and the piston. To lengthen the service life of the diaphragm, the diaphragm is associated with a washer comprised of a slightly deformable material.

17 Claims, 2 Drawing Sheets

DIAPHRAGM VALVE

BACKGROUND OF THE INVENTION

This invention relates to a diaphragm valve for compressed or liquified gases. More particularly, this invention relates to a diaphragm valve comprising a body containing a closing member with a sealing surface at the intersection of an inlet duct and an outlet duct for the passage of gas, a piston subjected to the action of elastic means, control means being connected to the closing member via both a pusher and a sealing diaphragm arranged between the pusher and the piston whereby the control means either reduces the passage between the inlet duct and the outlet duct counter to the action of the elastic means or enlarges the passage under the action of the elastic means.

There are various types of prior art valves suitable for use with compressed gas. These known valves essentially differ in their systems for sealing relative to the atmosphere. Each prior art valve has its advantages and disadvantages. For example, valves in which sealing is ensured by an O-ring or packing material have the advantage of longer service life and the disadvantage of progressive deterioration, that is, the gas leaks become progressively greater.

Another type of known prior art valves are those employing sealing diaphragms. The advantages of such diaphragm valves is that they can contain high pressures and are not attacked or affected by gases. On the other hand, the diaphragms have a relatively short life, and in the event of wear they break virtually instantaneously; resulting in a major gas leak when such a break occurs. Consequently, these valves do not ensure sufficient safety in uses where dangerous or toxic gases are involved.

SUMMARY OF THE INVENTION

The above-discussed and other drawbacks and deficiencies of the prior art are overcome or alleviated by the novel valve assembly of the present invention. In accordance with the present invention, a valve which combines the advantages of prior art valves, without any of the disadvantages, is presented. In a preferred embodiment, this novel valve utilizes a diaphragm which is associated with a washer comprised of a slightly deformable material. The washer is preferably sealingly wedged between a pusher and a circular recess in the head of the pusher. The washer is preferably made of synthetic material. This washer acts to lengthen the service life of the diaphragm by reducing localized stresses on the diaphragm surface.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several Figures.

DESCRIPTION OF THE PREFERRED EMBODIMENT

Figure 1:
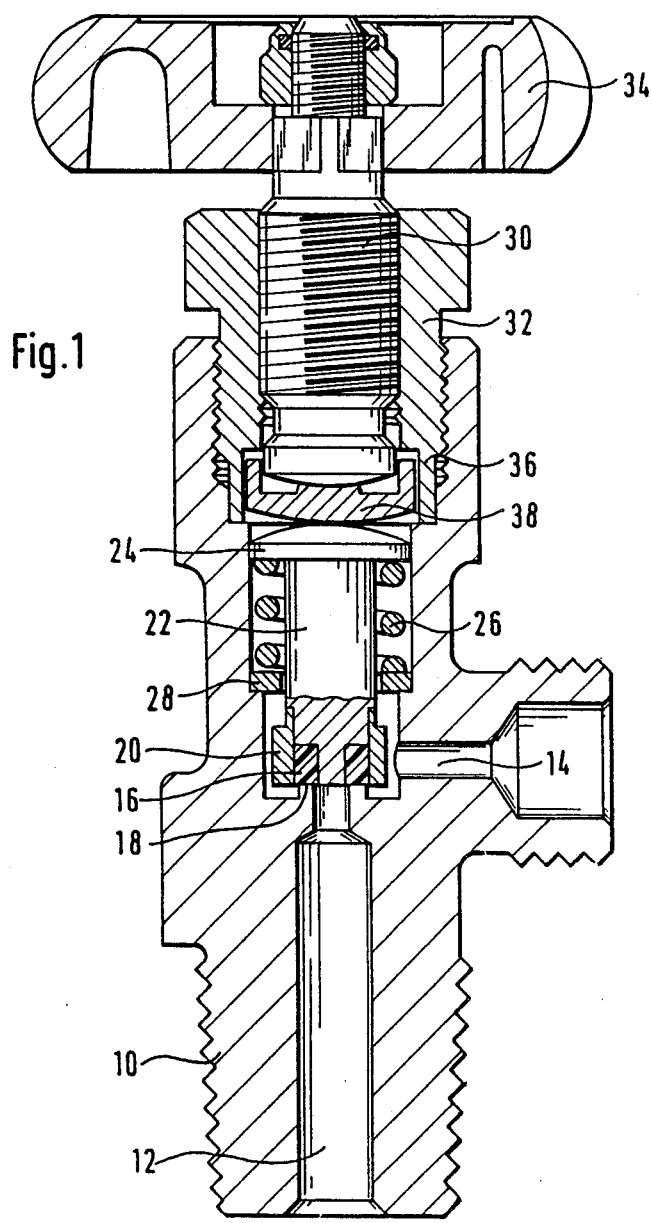
FIG. 1 is a cross-sectional elevation view of a valve in accordance with the present invention.

The valve illustrated in FIG. 1 comprises a body 10 which is made, for example, of stainless steel. The lower portion of body 10 has threading on the exterior thereof to allow it to be screwed directly onto a gas vessel. In the example illustrated, body 10 of the valve has an axial inlet duct 12 and and a radial or lateral outlet duct 14. At the intersection of the two ducts 12 and 14 is a sealing member comprising an insert 16 made, for example of a synthetic material such as polychloro tetrofluorethylene (PTCFE). Sealing member 16 interacts with a seat 18 in order to adjust (for example open or close) the passage between ducts 12 and 14. Insert 16 is wedged in a bush 20 forming the extension of a rod 22, of which the end opposite insert 16 is integral with a domed or arcuate head piston 24. Arranged about rod 22 is a helical spring 26 bearing both on piston head 24 and on a ring 28. Ring 28 is retained by means of a shoulder along axial bore 12 of body 10. Spring 26 consequently tends to lift insert 16 from its seat 18 in order to open the passage.

An upper rod 30 with an external screw thread passes through a stuffing box 32 which is itself screwed into the upper portion of body 10. Rod 30 can thus be moved axially as a result of rotation, for example by means of a handwheel 34.

The lower portion of stuffing box 32 is hollow and forms a guide bushing 36 of a pusher 38, the lower surface of which is domed or arcuate and the upper surface of which is in contact with the lower end of upper rod 30.

Figure 2:
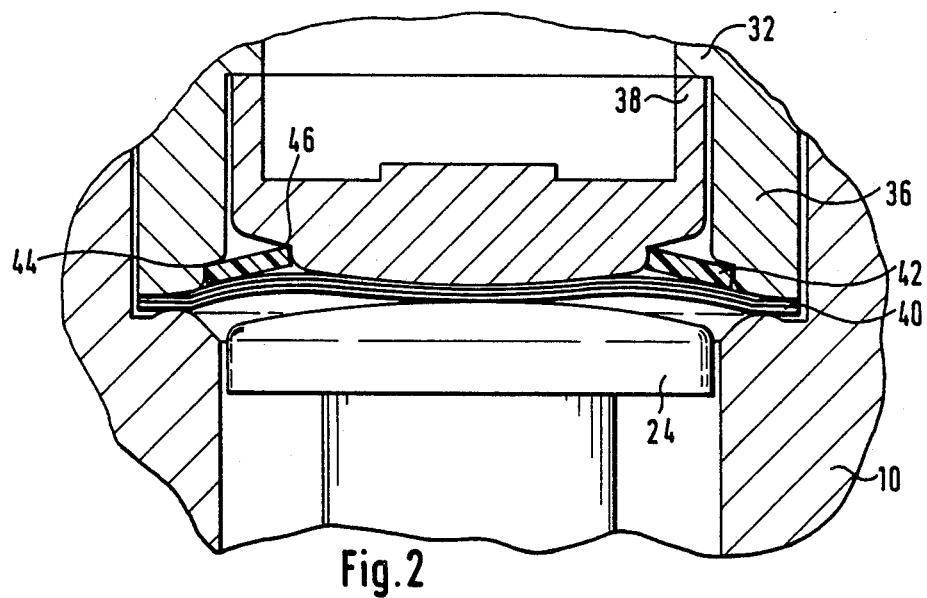
FIG. 2 is an enlarged fragmentary cross-sectional view of the valve of FIG. 1 in the region of the diaphragm, in the opened position.
Figure 3:
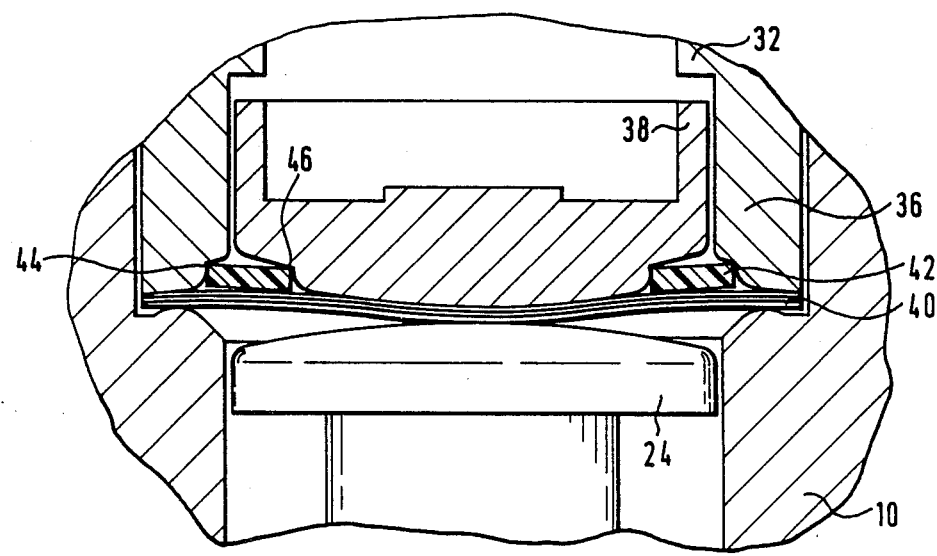
FIG. 3 is a cross-sectional view corresponding to that of FIG. 2, but showing the diaphragm in the closed position.

As shown in FIGS. 2 and 3, sealing towards the outside is ensured by a diaphragm 40 wedged between the lower edge of guide bush 36 and a circular shoulder of body 10. Diaphragm 40 preferably comprises a set of thin inserts made, for example, of stainless steel. The middle region of diaphragm 40 is wedged between the arcuate heads of piston 24 and pusher 38.

The opening of the valve (which results from the rotation of handwheel 34 to raise rod 30) enables piston 24 to be lifted under the action of spring 26 and to detach insert 16 from its seat 18. The rotation of handwheel 34 in the opposite direction causes pusher 38 and piston 24 to descend counter to the action of spring 26.

The opening and closing positions are illustrated respectively in FIGS. 2 and 3. It will be appreciated that the flexibility of diaphragm 40 allows it to follow this axial movement.

In conventional valves, the deformation of diaphragm 40 (upon opening and closing) imparts a bending which always occurs in the same place, that is, in the circular peripheral region, the radius of which corresponds to those of pusher 38 and of piston 24. Unfortunately, the repeated stresses in the same locations on the diaphragm cause it to deteriorate rapidly at this point; and if a break occurs there are immediate gas leaks.

To overcome this disadvantage, the present invention, in accordance with a preferred embodiment, provides a washer 42 which is placed on diaphragm 40 and the outer edge of which is wedged in an inner circular recess 44 of bushing 36. The inner edge of washer 42 fits about a circular recess made in the arcuate head of pusher 38. Washer 42 is comprised of a slightly deformable material, for example, a synthetic material, such as nylon or another polymeric material, so that it can ensure a certain degree of sealing even if diagram 40 breaks.

In addition to the particular feature of contributing to maintaining the sealing effect, another important function of washer 42 is to modify the deformation of diaphragm 40 under the action of pusher 38. In fact, because of the presence of washer 42, diaphragm 30 no longer undergoes highly localized peripheral bending, but changes as a whole between the configurations of FIGS. 2 and 3. The mechanical stresses exerted on diaphragm 40 are therefore distributed over its entire surface instead of being localized on a peripheral circle. This important feature has made it possible to considerably increase the service life of diaphragm 40 as well as the number of its operating cycles before a leak is detected.

Finally, it should be noted that the present invention can be used not only on shut-off valves, but also on adjusting vavles, pressure-reducing valves and the like, whether for compressed gases or for liquified gases.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A diaphragm valve for compressed or liquified gases comprising:
   a main body having an axial passage therethrough terminating at a first duct and a lateral passage communicating with said axial pasage and terminating at a second duct;
   a closing member in said axial passage communicating with said lateral passage, said closing member having opposed first and second ends including sealing means on said first end for precluding communication between said first and second ducts and piston means at said second end;
   elastic means acting on said piston means of said closing member to increase the amount of gas passing through said second duct;
   control means having an end extending into said axial passage in alignment with said closing member;
   pusher means being associated with said control means, said pusher means acting on said piston means to decrease the amount of gas passing through said second duct;
   diaphragm sealing means between said pusher means and said piston means, said diaphragm sealing means having opposed sides with said pusher means acting on one side and said piston means acting on the other side;
   resilient washer means between said diaphragm means and said pusher means, said resilient washer means tending to distribute the action exerted by said pusher means and piston means evenly over said diaphragm means; and
   annular bushing means in said main body, said pusher means being received in said bushing means with an annular gap being defined between said pusher means and said bushing means, said resilient washer means bridging said annular gap between said pusher means and bushing means.

2. The valve of claim 1 wherein said resilient washer means comprises:
   slightly deformable material.

3. The valve of claim 2 wherein said resilient washer means comprises:
   a polymeric material.

4. The valve of claim 1 including:
   a first recess in said annular bushing means;
   a second recess in said pusher means, said first and second recesses communicating with each other; and
   said washer means being disposed in said first and second recesses and wedged between said recesses and said diaphragm sealing means.

5. The valve of claim 4 including:
   an annular housing threadibly received in said main body portion in alignment with said axial passage, said control means being received in said annular housing, said annular bushing means comprising an end of said annular housing.

6. The valve of claim 5 including:
   means for axially moving said control means in said annular housing.

7. The valve of claim 4 including:
   a second shoulder in said axial passage, said diaphragm means located on said second shoulder means in contact with said annular bushing means.

8. The valve of claim 1 wherein:
   said pusher means has an arcuate surface contacting said diaphragm means.

9. The valve of claim 8 wherein:
   said piston means has an arcuate surface contacting said diaphragm means.

10. The valve of claim 1 wherein:
    said piston means has an arcuate surface contacting said diaphragm means.

11. The valve of claim 1 wherein:
    said elastic means comprises a spring.

12. The valve of claim 1 wherein said piston means comprises a head attached to a shaft and including:
    a first shoulder in said axial passage, said elastic means being positioned between said first shoulder and said head of said piston means.

13. The valve of claim 12 wherein:
    said elastic means is disposed about said shaft of said piston means.

14. The valve of claim 1 wherein:
    said first duct is an inlet duct; and
    said second duct is an outlet duct.

15. A diaphragm valve for compressed or liquified gases comprising:
    a main body having an axial passage therethrough terminating at a first duct and a lateral passage communicating with said axial passage and terminating at a second duct;
    a closing member in said axial passage communicating with said lateral passage, said closing member having opposed first and second ends including sealing means on said first end for precluding communication between said first and second ducts and piston means at said second end;
    elastic means acting on said piston means of said closing member to increase the amount of gas passing through said second duct;
    control means having an end extending into said axial passage in alignment with said closing member;
    pusher means being associated with said control means, said pusher means acting on said piston means to decrease the amount of gas passing through said second duct;

diaphragm sealing means between said pusher means and said piston means, said diaphragm sealing means having opposed sides with said pusher means acting on one side and said piston means acting on the other side;

resilient washer means associated with said diaphragm means tending to distribute the action exerted by said pusher means and piston means evenly over said diaphragm means;

annular bushing means in said main body, said pusher means being received in said bushing means;

a first recess in said annular bushing means;

a second recess in said pusher means, said first and second recesses communicating with each other; and said washer means being disposed in said first and second recesses and wedged between said recesses and said diaphragm sealing means.

16. The valve of claim 15 including:

an annular housing threadibly received in said main body portion in alignment with said axial passage, said control means being received in said annular housing, said annular bushing means comprising an end of said annular housing.

17. The valve of claim 16 including:

means for axially moving said control means in said annular housing.

* * * * *